United States Patent [19]

Lew

[11] Patent Number: 4,951,506

[45] Date of Patent: Aug. 28, 1990

[54] ROLLING CONTACT OHMIC RESISTANCE POSITION SENSOR

[76] Inventor: Hyok S. Lew, Arvada, Colo.

[21] Appl. No.: 193,042

[22] Filed: May 12, 1988

Related U.S. Application Data

[63] Continuation-in-part of Ser. No. 7/071,776, Jul. 10, 1987, Pat. No. 4,796,472.

[51] Int. Cl.$^5$ .................. G01F 01/24; G01F 23/36; G01N 27/00; G01R 31/00
[52] U.S. Cl. .................. 73/314; 73/DIG. 5; 73/308; 324/716; 338/33; 338/43; 338/47; 340/686
[58] Field of Search .............. 73/313, 308, DIG. 5; 338/33; 340/686; 73/314; 338/47, 43

[56] References Cited

U.S. PATENT DOCUMENTS

| | | | |
|---|---|---|---|
| 1,988,192 | 1/1935 | Drabin | 338/33 X |
| 2,233,572 | 3/1941 | Atkins | 73/DIG. 5 X |
| 2,305,973 | 12/1942 | Marchment | 338/33 |
| 2,592,929 | 4/1952 | Matchett | 73/313 |
| 3,572,122 | 3/1971 | Nusbaum | 73/314 |
| 3,805,613 | 4/1974 | Stone | 338/33 X |
| 4,796,472 | 1/1989 | Lew | 73/313 |
| 4,806,915 | 2/1989 | Rasmussen | 340/686 |

FOREIGN PATENT DOCUMENTS

2738296 3/1979 Fed. Rep. of Germany ........ 73/314

*Primary Examiner*—Daniel M. Yasich

[57] ABSTRACT

The position sensor of the present invention includes a pair of elongated conducting members disposed in a parallel arrangement and a conducting metallic ball or mercury drop freely movable following the pair of elongated conducting members while maintaining a simultaneous contact with the pair of elongated conducting members, which combination provides two electric circuits respectively including a first circuit including a first poriton of the two elongated conducting members and the contact provided by the metallic ball or mercury drop, and a second electric circuit including the second portion of the two elongated conducting members and the same contact, wherein the metallic ball or mercury drop divides the combination of the two elongated conducting members into the first and second portions. The relative position of the metallic ball or mercury drop under a magnetic force field or the earth's gravitational force field over the length of the two elongated conducting members is determined by comparing the ohmic resistance of the first and second electric circuits, which position so determined is independent of the ohmic resistance of the contact provided by the metallic ball or mercury drop. At least one of two elongated conducting members has a high specific ohmic resistance.

11 Claims, 1 Drawing Sheet

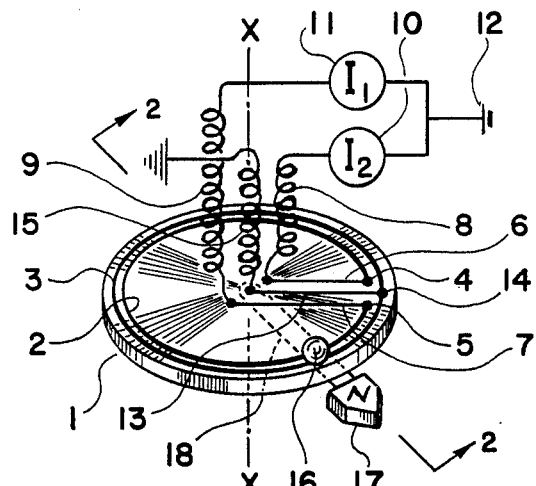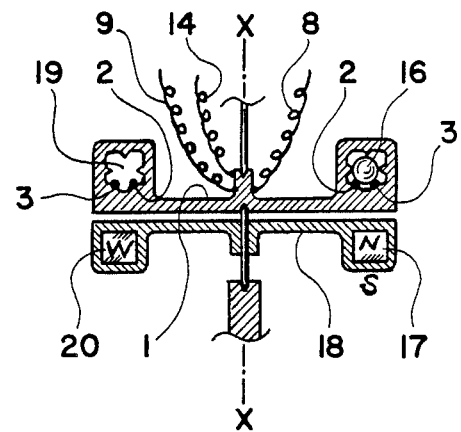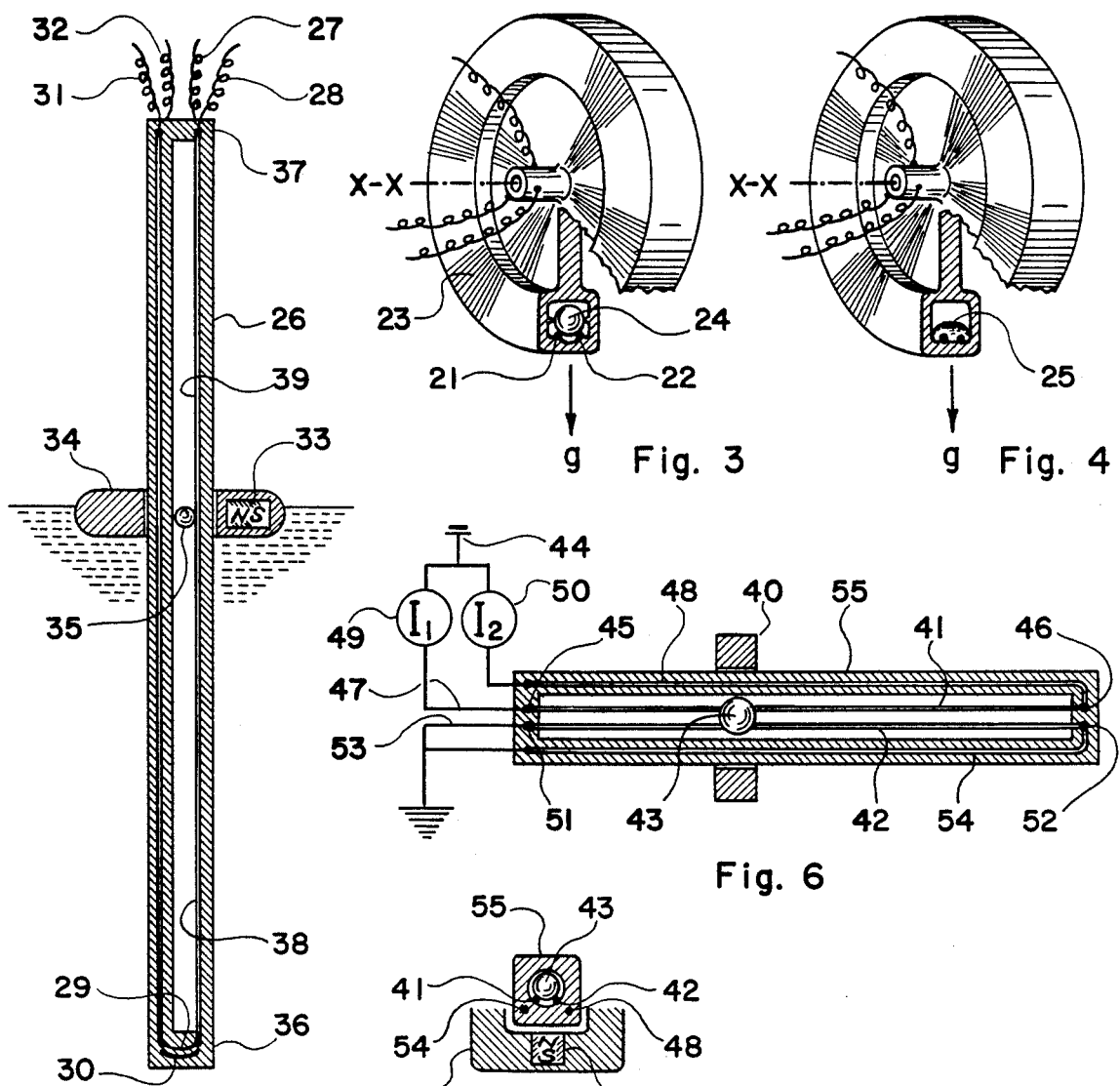

ROLLING CONTACT OHMIC RESISTANCE POSITION SENSOR

This patent application is a Continuation-In-Part to patent application Ser. No. 071,776 entitled "Level detector with multiple magnetically activated switches" filed on July 10, 1987, which is now U.S. Pat. No. 4,796,472.

BACKGROUND OF THE INVENTION

The measurement and control systems in the chemical, mineral, pharmaceutical and food processing industries needs a continuously reading position sensor that has minimum resistance against the change of the position being measured, which position sensor is simple in terms of operating principles and mechanism, compact and light weight in bulk and inexpensive in cost. In spite of the strong demand for such a position sensor by the processing industries, the present day technology does not provide one.

BRIEF SUMMARY OF THE INVENTION

The primary object of the present invention is to provide a position sensor comprising a pair of parallel elongated conducting members having a high specific ohmic resistance and a metallic ball or mercury drop providing an electrical contact between the two elongated conducting members, wherein the metallic ball or mercury drop moves substantially freely under the influence of a physical force, and for example, as in following the two elongated conducting members in rolling motion.

Another object is to determine the relative position of the metallic ball or the mercury drop over the length of the pair of elongated conducting members by comparing the ohmic resistance of two electric circuits respectively including a first portion of the two elongated conducting members and the rolling contact provided by the metallic ball or mercury drop, and the second portion of the two elongated conducting members and the same rolling contact, wherein the metallic ball or mercury drop divides the pair of elongated conducting members into the first and second portion.

A further object is to determine the relative position of the metallic ball or mercury drop by a method that provides results independent of the ohmic resistance of the rolling contact provided by the metallic ball or mercury drop.

Yet another object is to use a ferromagnetic ball under a magnetic field or a metallic ball or mercury drop under the earth's gravitational force field as the moving contact rolling along the pair of elongated conducting members.

Yet a further object is to provide a linear position sensor comprising the pair of straight elongated conducting members and the rolling contact.

Still another object is to provide a rotary position sensor comprising the pair of arcuated elongated conducting members and the rolling contact.

Still a further object is to provide a level sensor detecting the free surface of the liquid, which employs a float including a magnet that moves the rolling contact therewith.

These and other objects of the present invention will become clear as the description thereof progresses.

BRIEF DESCRIPTION OF THE FIGURES

The present invention may be described with a great clarity and specificity by referring to the following figures:

FIG. 1 illustrates a perspective view of an embodiment of the rotary position sensor of the present invention.

FIG. 2 illustrates a cross section of the embodiment shown in FIG. 1.

FIG. 3 illustrates a perspective view of another embodiment of the rotary position sensor of the present invention.

FIG. 4 illustrates a perspective view of a further embodiment of the rotary position sensor of the present invention.

FIG. 5 illustrates a cross section of an embodiment of the level sensor of the present invention.

FIG. 6 illustrates a cross section of an embodiment of the linear position sensor of the present invention.

FIG. 7 illustrates a cross section of the embodiment shown in FIG. 5 or 6.

DESCRIPTION OF ILLUSTRATED EMBODIMENTS

In FIG. 1 there is illustrated a perspective view of an embodiment of the rotary position sensor of the present invention. The support disc 1 coaxially disposed about an axis X—X includes a pair of elongated conducting members 2 and 3 disposed in a parallel and coaxial arrangement on a plane generally perpendicular to the axis X—X of the coaxial arrangement, wherein at least one of the two elongated conducting members 2 and 3 has high specific ohmic resistance. The two extremities 4 and 5 of the first elongated conducting member 2 forming an open circular loop are respectively connected to two conductor wires 6 and 7 converging towards the axis X-X, where the two conducting wires extend to a flexible wire 8 with the first ampere meter 11 and wire 9 with the second ampere meter 12, respectively, which are connected to a source of electromotive force 12. The second elongated conducting member 3 forming a closed circular loop is connected to the conductor wire 13 routed towards the axis X—X at the junction 14, where it extends to the flexible wire 15 that is grounded A metallic ball 16 made of a ferromagnetic material rests on the two elongated conducting members 2 and 3 in a free-rolling arrangement. A magnet 17 located at a target position is disposed on the other side of the support disc 1 at a radial distance generally equal to the radius of the elongated conducting members 2 and 3 disposed in circular loops. Depending on the particular nature of applications, the support disc 1 may rotate about the axis X—X while the magnet 17 is held stationary, or the magnet 17 supported by an arm 18 rotatable about the axis X—X may rotate about the axis X—X while the support disc 1 is held stationary, or both of the support disc 1 and the magnet 17 may be allowed to rotate. The magnet or disc is affixed to a rotating object, of which rotary position is to be measured by the position sensor of the present invention.

In FIG. 2 there is illustrated a cross section of the embodiment shown in FIG. 1, which cross section taken along plane 2—2 as shown in FIG. 1 shows an embodiment of the actual construction The metallic conducting ball 16 resting on the pair of elongated conducting members 2 and 3 is confined within a toroidal cavity 19 including a plurality of guide rails, which guide rails do not touch the metallic ball 16 when it rests on the pair of elongated conducting members 2 and 3. The magnet 17 supported by an arm 18 is in balance with a counter-weight 20, which arrangement minimizes friction against the rotating movement of the arm 18 about the axis X—X. The particular embodiment of the construction shown in FIG. 2 is an arrangement wherein the support disc 1 as well as the arm 18 rotates about the axis X—X. In an arrangement wherein only the support disc 1 rotates, the magnet 17, can be affixed to a stationary structure in a simple arrangement.

The rotary position sensor illustrated in FIGS. 1 and 2 operates on the following principles: A relative rotary motion about the axis X—X between the support disc 1 and the magnet 17 charges the location of the metallic ball 16 providing a rolling contact between the two elongated conducting members 2 and 3, as the metallic ball made of a ferromagnetic material rolling on the pair of the rails provided by the two elongated conducting members 2 and 3 follows the magnet 17. The rolling contact between the two elongated conducting members 2 and 3 provided by the metallic ball 16 establishes two electrical circuits; the first circuit comprising a first portion of the two elongated conducting members and the rolling contact, and the second circuit comprising the second portion of the two elongated conducting members and the same rolling contact, wherein the rolling contact divides the two elongated conducting members into the first and second portions. It can be easily shown that the angular position of the magnet 16 measured from the reference radius including terminal point 5 is given by equation $$\frac{\theta}{\theta_0} = \frac{\Omega_1 - \Omega_2 - (R_{con.1} - R_{con.2})}{4\rho\theta_0} + \frac{1}{2}, \quad (1)$$

where $\theta_0$ is the total major angle between the two terminal points 5 and 6, $\Omega_1$ and $\Omega_2$ are ohmic resistances respectively measured by the ampere meters 11 and 10, $R_{con.1}$ and $R_{con.2}$ are respectively the ohmic resistances of the connecting wires 9 and 8, and $\rho$ is the specific ohmic resistance of the high ohmic elongated members 2 and 3. The equation (1) is for an embodiment wherein both of the elongated conducting members have high specific ohmic resistance $\rho$. When the ohmic resistances of the connecting wires 8 and 9 are matched, equation (1) reduces to $$\frac{\theta}{\theta_0} = \frac{\Omega_1 - \Omega_2}{4\rho\theta_0} + \frac{1}{2}. \quad (2)$$

When only one of the two elongated conducting members has high specific resistance, the numeral 4 appearing in the denominator in equation (1) and (2) must be replaced by numeral 2. It should be understood that the first elongated conducting member 2 as well as the second elongated conducting member 3 may be an open loop construction, for the principles of the present invention can be practiced as long as the rolling contact 16 provides two electrical circuits from the pair of elongated conducting members 2 and 3 in such a way that the ohmic resistance of the two electrical circuits are measurable. In actual applications of the rotary position sensor illustrated in FIGS. 1 and 2, a shaft or spindle, of which rotary position or movement is required to be detected, is disposed in line with the axis X—X and coupled either to the support disc 1 or the arm 18 with magnet 17. The embodiment shown in FIGS. 1 and 2 operates best when the axis X—X is disposed in the vertical direction.

In FIG. 3 there is illustrated a perspective view of another embodiment of the rotary position sensor of the present invention operating on the same principles as those described in conjunction with FIGS. 1 and 2. The pair of elongated conducting members 21 and 22 of high specific ohmic resistance are disposed in a parallel relationship on a circular cylindrical surface coaxial about the axis of rotation X—X, about which the support disc 23 is allowed to rotate. The metallic ball 24 providing the rolling electrical contact between the two elongated conducting members 21 and 22 remains at the lowest position due to the earth's gravitational pull independent of the rotary movement of the support disc 23 about the axis X—X. The metallic ball 24 may be replaced by an electrically conducting liquid drop such as a mercury drop as shown by the embodiment illustrated in FIG. 4, which liquid drop rolls like a metallic ball due to the surface tension thereof. The ohmic resistances of the two electrical circuits commonly including the rolling contact 24 provides the angular position of the support disc 23 relative to a target angular position occupied by the rolling contact 24 as described in conjunction with equations (1) and (2). In place of the earth's gravitational pull, a magnet may be employed to keep the rolling contact 24 at a fixed position that can be other than the lowest position shown in the particular embodiment. The embodiment shown in FIG. 3 performs best when the axis X—X is disposed horizontally.

In FIG. 4 there is illustrated a perspective view of a further embodiment of the rotary position of the present invention, that has the same construction as the embodiment shown in FIG. 3 with one exception being that the rolling contact 25 is now provided by a mercury drop in place of a metallic ball. It should be understood that the pair of the elongated conducting members may be disposed in a helical arrangement and, consequently, the rotary positions over a large angles can be measured.

In FIG. 5 there is illustrated a cross section of a level detector constructed in accordance with the principles of the present invention. The two elongated conducting members disposed within a sealed elongated cylindrical container in a straight and parallel arrangement are bonded to the inner wall thereof. The first extremities of the two elongated conducting members are respectively connected to two wires 27 and 28, while the second extremities thereof are respectively connected to another pair of connecting wires 29 and 30, which are routed through the wall of the cylindrical container 26 and emerge as two wires 31 and 32. The magnet 33 included in the float 34 located at a target position attracts the rolling contact ball 35 made of a ferromagnetic material, wherein the ball 35 rolls following the pair of rails formed by the two elongated conducting members as the ball 35 follows the magnet 33 in the float 34. The position of the float 34 at a distance h measured from the lower extremity 36 of the two elongated conducting members is given by the equation $$\frac{h}{h_0} = \frac{\Omega_1 - \Omega_2 - (R_{con.1} - R_{con.2})}{4\rho h_0} + \frac{1}{2}, \quad (3)$$

where $h_0$ is the distance between the two extremities 36 and 37 of the two elongated conducting members, and $\Omega_1$ and $\Omega_2$ are ohmic resistance of the two electrical circuits 38 and 39 defined in the same way as the two electric circuits described in conjunction with FIG. 1. Other symbols in equation (3) are the same as those defined in conjunction with equation (1). When the resistances of the connecting wires are matched, equation (3) reduces to $$\frac{h}{h_0} = \frac{\Omega_1 - \Omega_2}{4\rho h_0} + \frac{1}{2}. \quad (4)$$

Equations (3) and (4) are for the case wherein both of the two elongated conducting members have high specific ohmic resistance. When only one of the two elongated conducting members has high specific ohmic resistance, the numeral 4 appearing in the denominator in equations (3) and (4) has to be changed to numeral 2. The equations (1), (2), (3) and (4) show a few examples of arithmetics that determine the angular or linear position of the marker as a function of the two ohmic resistance values measured in accordance with the teachings of the present invention. The final form of the equation actually employed in determining the position of the marker from the two measured values of the ohmic resistance in the practice of the present invention should be derived based on a theoretical basis and calibrated empirically.

In FIG. 6 there is illustrated a cross section of an embodiment of the linear position sensor having essentially the same construction as the embodiment shown in FIG. 1 with one exception being that the target position marker 40 with a magnet now replaces the float 34 shown in FIG. 5. The target position marker 40 is affixed to a moving object of which linear position is to be measured by the position sensor of the present invention. The pair of elongated conducting members 41 and 42 of high specific ohmic resistance form a pair of parallel rails on which the metallic ball of ferromagnetic material 43 rolls along. The rolling contact between the two elongated conducting members 41 and 42 provided by the metallic ball 43 divides the pair of the elongated conducting members 41 and 42 into the first and second portion. The position of the metallic ball 43 and, consequently, that of the marker 40 is determined by measuring the ohmic resistance of the first electrical circuit comprising the first portion of the two elongated conducting members and the rolling contact and the ohmic resistance of the second electric circuit comprising the second portion of the two elongated conducting members and the same rolling contact as described in conjunction with equations (3) and (4). One embodiment of ohmic resistance measuring circuit comprises a source 44 of the electromotive force respectively connected to the two extremities 45 and 46 of the first elongated conducting member 41 by a pair of wires 47 and 48, which wires respectively includes ampere meter 49 and 50. The two extremities 51 and 52 of the second elongated conducting member 42 are respectively connected to two wires 53 and 54 which are grounded. The resistances cf the two electric circuits are determined by dividing the imposed electromotive force by the amount of electric currents measured by the ampere meters 49 and 50, respectively.

In FIG. 7 there is illustrated a cross section representing the typical cross section of the embodiment shown in FIG. 5 or 6. The metallic ball 43 confined within a bore with a diameter slightly greater than that of the metallic ball 43 rest on the two elongated conducting members 41 and 42, at least one of which has high specific ohmic resistance. The two wires 48 and 54 routed through the wall of the cylindrical container are respectively connected to the elongated conducting members 41 and 42 at the extremities thereof. The movement of the magnet 56 included in the marker 40 is duplicated by the metallic ball 43, which rolls freely on the two elongated conducting members as the marker 40 moves.

While the principles of the present invention have now been made clear by the illustrative embodiments, there will be immediately obvious to those skilled in the art many modifications of the structures, arrangements, proportions, elements and materials which are particularly adapted to the specific working environments and operating conditions in the practice of the invention without departing from those principles. It is not desired to limit the inventions to the particular illustrated embodiments shown and described and accordingly, all suitable modifications and equivalents may be resorted to falling within the scope of the inventions as defined by the claim which follow.

The embodiment of the invention, in which an exclusive property or priviledge is claimed, are defined as follows:

1. A device for measuring position of a rolling mass representing a variable position under measurement comprising in combination:
   (a) a pair of elongated electrically conducting members disposed in a side by side arrangement with a generally constant distance of separation therebetween, wherein at least one of the pair of elongated electrically conducting members has a high specific ohmic resistance;
   (b) an electrically conducting mass freely moveable along the pair of elongated electrically conducting members by rolling action; said electrically conducting mass attracted to a variable position by a physical force along and relative to the pair of elongated electrically conducting members;
   (c) means for a first ohmic resistance of a first electric circuit comprising first positions of the pair of elongated electrically conducting members electrically connected to one another by the electrically conducting mass, and for measuring a second ohmic resistance of a second electric circuit comprising second portions of the pair of elongated electrically conducting members electrically connected to one another by the electrically conducting mass, said first and second portions of the pair of elongated electrically conducting members being two portions thereof respectively located on two opposite sides of the electrically conducting mass; and
   (d) electrical circuit means for determining said variable position from a combination of said first and second ohmic resistances, wherein the contact ohmic resistance contributed by the contact between said electrically conducting mass and said pair of elongated electrically conducting members is eliminated by electrical circuit means in determining said variable position by said electrical circuit means, whereby said variable position is determined independent of the contact ohmic resistance.

2. The combination as set forth in claim 1 wherein said variable position represents a position of a marker including a magnet that attracts the electrically conducting mass thereto, wherein the marker takes a variable position along and relative to the pair of elongated electrically conducting members.

3. The combination as set forth in claim 1 wherein said variable position represents the position of equilibrium of a force experienced by the electrically conducting mass, wherein said force attracts the electrically conducting mass to said position of equilibrium.

4. The combination as set forth in claim 3 wherein said force experienced by the electrically conducting mass is the earth's gravitational force.

5. The combination as set forth in claim 3 wherein the electrically conducting mass is a metallic ball.

6. The combination as set forth in claim 3 wherein the electrically conducting mass ia a liquid drop.

7. The combination as set forth in claim 3 wherein the pair of elongated electrically conducting members are disposed in a curved pattern on a plane.

8. The combination as set forth in claim 3 wherein the pair of elongated electrically conducting members are disposed in a curved pattern on a cylindrical surface.

9. The combination as set forth in claim 3 wherein the pair of elongated electrically conducting members are disposed in a rectilinear arrangement.

10. The combination as set forth in claim 9 wherein the pair of elongated electrically conducting members are contained in an elongated cylindrical container and said variable position represents a position of a marker including a magnet that attracts the electrically conducting mass thereto, wherein the marker is disposed externally to and slidable along the elongated cylindrical container.

11. The combination as set forth in claim 10 wherein the marker is a float slidable along the elongated cylindrical container and floating on the free surface of a liquid.

* * * * *